(12) United States Patent
Hawass

(10) Patent No.: US 11,447,247 B2
(45) Date of Patent: Sep. 20, 2022

(54) MULTI-MODULAR AERIAL FIREFIGHTING CONTROL METHOD AND APPARATUS

(71) Applicant: Oubada Hawass, Mississauga (CA)

(72) Inventor: Oubada Hawass, Mississauga (CA)

( * ) Notice: Subject to any disclaimer, the term of this patent is extended or adjusted under 35 U.S.C. 154(b) by 0 days.

(21) Appl. No.: 16/951,309

(22) Filed: Nov. 18, 2020

(65) Prior Publication Data

US 2021/0070443 A1 Mar. 11, 2021

Related U.S. Application Data

(63) Continuation of application No. 16/255,901, filed on Jan. 24, 2019, now Pat. No. 10,875,647, which is a continuation of application No. 15/383,697, filed on Dec. 19, 2016, now abandoned, and a continuation of application No. PCT/CA2016/051450, filed on Dec. 9, 2016, which is a continuation of application No. 14/692,125, filed on Apr. 21, 2015, now Pat. No. 9,555,886.

(60) Provisional application No. 62/003,543, filed on May 27, 2014, provisional application No. 61/982,489, filed on Apr. 22, 2014.

(51) Int. Cl.
*F24D 19/02* (2006.01)
*B64D 1/16* (2006.01)
*B64C 39/04* (2006.01)
*A62C 3/02* (2006.01)

(52) U.S. Cl.
CPC .............. *B64D 1/16* (2013.01); *A62C 3/0242* (2013.01); *B64C 39/04* (2013.01); *B64C 2201/021* (2013.01); *B64C 2201/12* (2013.01)

(58) Field of Classification Search
CPC ......... B64D 1/16; A62C 3/0242; B64C 39/04; B64C 2201/021; B64C 2201/12
USPC ............................................................ 165/53
See application file for complete search history.

(56) References Cited

U.S. PATENT DOCUMENTS

| 2,779,421 A | 1/1957 | Rust |
| 3,220,482 A | 11/1965 | Eveleth |
| 3,241,617 A | 3/1966 | Jamison |
| 3,428,131 A | 2/1969 | Winslow |

(Continued)

FOREIGN PATENT DOCUMENTS

| CN | 202724530 U | 2/2013 |
| CN | 103754368 A | 4/2014 |

(Continued)

OTHER PUBLICATIONS

Inventec S.L., New Aerial Works' Equipment, http://inventec.es/wp-content/uploads/2014/09/AERIAL-WORKS-EQUIP-INVENTEC.pdf.

(Continued)

*Primary Examiner* — Davis D Hwu
(74) *Attorney, Agent, or Firm* — Standley Law Group LLP; Eric M. Gayan

(57) ABSTRACT

A multi-modular aerial firefighting control method and apparatus for use by firefighters to control fire. The multi-modular aerial firefighting control method and apparatus generally includes multi-modular units that are held together to form an aerial firefighting system. The modular units may work together or independently. The multi-modular system comprises more than one modular unit, fluid, fluid conduit, reservoir, air flow generator, multi-modular unit support structure, aerial suspension system and aerial lift system.

3 Claims, 17 Drawing Sheets

(56) References Cited

U.S. PATENT DOCUMENTS

| | | | |
|---|---|---|---|
| 3,428,276 A | 2/1969 | Hubbard | |
| 3,442,334 A | 5/1969 | Gousetis | |
| 3,485,302 A | 12/1969 | Thorpe | |
| 3,580,339 A | 5/1971 | Nance | |
| 3,604,509 A | 9/1971 | Sachnik | |
| 3,698,480 A * | 10/1972 | Newton | B64D 1/16 169/43 |
| 3,714,987 A | 2/1973 | Mattson | |
| 3,759,330 A | 9/1973 | Rainey et al. | |
| 3,933,309 A | 1/1976 | Odegaard | |
| 4,055,303 A | 10/1977 | Brown | |
| 4,270,698 A | 6/1981 | Bisa et al. | |
| 4,328,940 A | 5/1982 | Malcolm | |
| 4,344,489 A | 8/1982 | Bonaparte | |
| 4,560,107 A | 12/1985 | Inculet | |
| 4,936,389 A | 6/1990 | MacDonald et al. | |
| 4,971,082 A * | 11/1990 | Kovaletz | B24C 3/06 134/34 |
| 4,979,571 A | 12/1990 | MacDonald | |
| 5,248,086 A | 9/1993 | Waldrum et al. | |
| 5,337,830 A | 8/1994 | Bowman | |
| 5,385,208 A | 1/1995 | Baker et al. | |
| 5,549,259 A | 8/1996 | Herlik | |
| 5,590,717 A | 1/1997 | McBay et al. | |
| 5,699,862 A | 12/1997 | Rey | |
| 6,311,780 B1 | 11/2001 | Zuev et al. | |
| 6,688,402 B1 | 2/2004 | Wise | |
| 6,769,493 B1 | 8/2004 | Fima et al. | |
| 6,889,776 B2 | 5/2005 | Cheung | |
| 7,083,121 B2 | 8/2006 | Huffman | |
| 7,165,627 B2 | 1/2007 | Hutter et al. | |
| 7,225,999 B2 | 6/2007 | Foianini et al. | |
| 7,303,168 B1 | 12/2007 | Lazes | |
| 7,748,662 B2 | 7/2010 | Hale et al. | |
| 7,819,362 B2 | 10/2010 | Hale et al. | |
| 8,006,223 B2 | 8/2011 | Boulineau et al. | |
| 8,356,676 B2 | 1/2013 | Casals | |
| 8,820,422 B2 | 9/2014 | Parker | |
| 9,555,886 B1 | 1/2017 | Hawass | |
| 2002/0121382 A1 | 9/2002 | Fima et al. | |
| 2005/0178565 A1 | 8/2005 | Voss | |
| 2008/0087444 A1 | 4/2008 | Held | |
| 2009/0266566 A1 | 10/2009 | Bin Abdul Aziz Al Saud | |
| 2011/0168414 A1 | 7/2011 | Nelson | |
| 2013/0056230 A1 | 3/2013 | Lemke et al. | |
| 2013/0199806 A1 | 8/2013 | Zimmerman et al. | |
| 2013/0277074 A1 | 10/2013 | Corujo Pardo | |
| 2013/0292142 A1 | 11/2013 | Goddard et al. | |
| 2014/0069666 A1 | 3/2014 | Vetesnik | |
| 2014/0246213 A1 | 9/2014 | Karagounis | |

FOREIGN PATENT DOCUMENTS

| | | |
|---|---|---|
| FR | 2761950 A1 | 10/1998 |
| WO | 9852647 A1 | 11/1998 |
| WO | 2015129767 A1 | 9/2015 |
| WO | 2015136128 A1 | 9/2015 |

OTHER PUBLICATIONS

Simplex Aerospace, Spray Systems Overview, http://cr4.globalspec.com/thread/67588/Forest-Fire-Fighting-Machine.

* cited by examiner

MULTI-MODULAR AERIAL FIREFIGHTING CONTROL METHOD AND APPARATUS

CROSS-REFERENCE TO RELATED APPLICATIONS

This application is a continuation of U.S. application Ser. No. 16/255,901, filed Jan. 24, 2019, which is a continuation of U.S. application Ser. No. 15/383,697, filed Dec. 19, 2016, which is a continuation of U.S. application Ser. No. 14/692,125, filed Apr. 21, 2015, which claims the benefit of U.S. Provisional Application No. 61/982,489, filed Apr. 22, 2014, and U.S. Provisional Application No. 62/003,543, filed May 27, 2014, and is also a continuation of International Application No. PCT/CA2016/051450, filed Dec. 9, 2016, each of which is hereby incorporated by reference as if fully recited herein.

TECHNICAL FIELD

Exemplary embodiments of the disclosure relate generally to methods and devices for the aerial delivery of fluids for firefighting and the like.

BACKGROUND AND BRIEF SUMMARY

The following presents a simplified summary of the general inventive concept herein to provide a basic understanding of some aspects of the invention. This summary is not an extensive overview of the invention. It is not intended to restrict key or critical elements of the invention or to delineate the scope of the invention beyond that explicitly or implicitly described by the following description and claims.

In one aspect, there is provided a modular unit for assembling, in multiples thereof, an aerial emergency fluid delivery boom for use in aerial emergency activities. The modular unit comprises an emergency fluid supply passage segment extending along an alignment path. An emergency fluid delivery plenum is downstream of, and in operative fluid communication with, the emergency fluid supply passage segment, the plenum including an air inlet and an air outlet for delivering emergency fluid under gravity thereto, in a designated operative form according to a corresponding emergency activity. The modular unit is configured for contiguous engagement with at least one other instance of the modular unit to form the aerial emergency fluid delivery boom, with the corresponding emergency fluid supply passage segments aligned along the alignment path and sealingly engaged at adjacent ones of the boundaries to form an assembled emergency fluid supply passage to receive a flow of said emergency fluid from an upstream source and to distribute the emergency fluid to each of the corresponding plenums.

Some exemplary embodiments further comprise a housing, the emergency fluid supply passage segment extending laterally across the housing with the open ends formed on opposite boundaries thereof.

In some exemplary embodiments, the plenum has a longitudinal axis transverse to the emergency fluid supply passage segment.

Some exemplary embodiments further comprise a reservoir configured to be in operative fluid communication with the emergency fluid supply passage segment for receiving emergency fluid therefrom and to deliver the emergency fluid to the plenum.

Some exemplary embodiments further comprise a pressurizing portion operatively associated with the inlet for pressuring the air flow through the plenum.

In some exemplary embodiments, the pressurizing portion is active.

In some exemplary embodiments, the pressurizing portion is passive.

Some exemplary embodiments provide an aerial firefighting distributor apparatus which includes multi-modular units held together to form the new aerial firefighting system and these modular units can work together or independently. The multi-modular system comprises one or more individual modular units, including one or more of a fluid conduit, a reservoir, air flow generator, a support structure, an aerial suspension system and an aerial lift system.

There has thus been outlined some of the features of the invention in order that the detailed description thereof may be better understood, and in order that the present contribution to the art may be better appreciated. There are additional features of the invention that will be described hereinafter.

It is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical, mechanical or electrical connections or couplings. Furthermore, and as described in subsequent paragraphs, the specific mechanical and/or other configurations illustrated in the drawings are intended to exemplify embodiments of the invention. However, other alternative mechanical and/or electrical or other configurations are possible which are considered to be within the teachings of the instant disclosure.

Thus, exemplary embodiments may provide a multi-modular aerial firefighting control method and apparatus for providing a firefighter with alternative and/or improved methods to control fire, and/or provide a firefighter with safer and easier methods to control fire, and/or to provide a firefighter with other methods and/or devices to control fire, or for other applications as discussed herein.

Thus, exemplary embodiments may also provide a multi-modular aerial distribution method and apparatus that is configured to distribute chemicals or fluids for agriculture, oil containment, de-icing, or weather control purposes.

BRIEF DESCRIPTION OF THE DRAWINGS

Various other objects, features and attendant advantages will become fully appreciated as the same becomes better understood when considered in conjunction with the accompanying drawings, in which like reference characters designate the same or similar parts throughout the several views, and wherein.

DETAILED DESCRIPTION OF EXEMPLARY EMBODIMENTS

Figure 1:
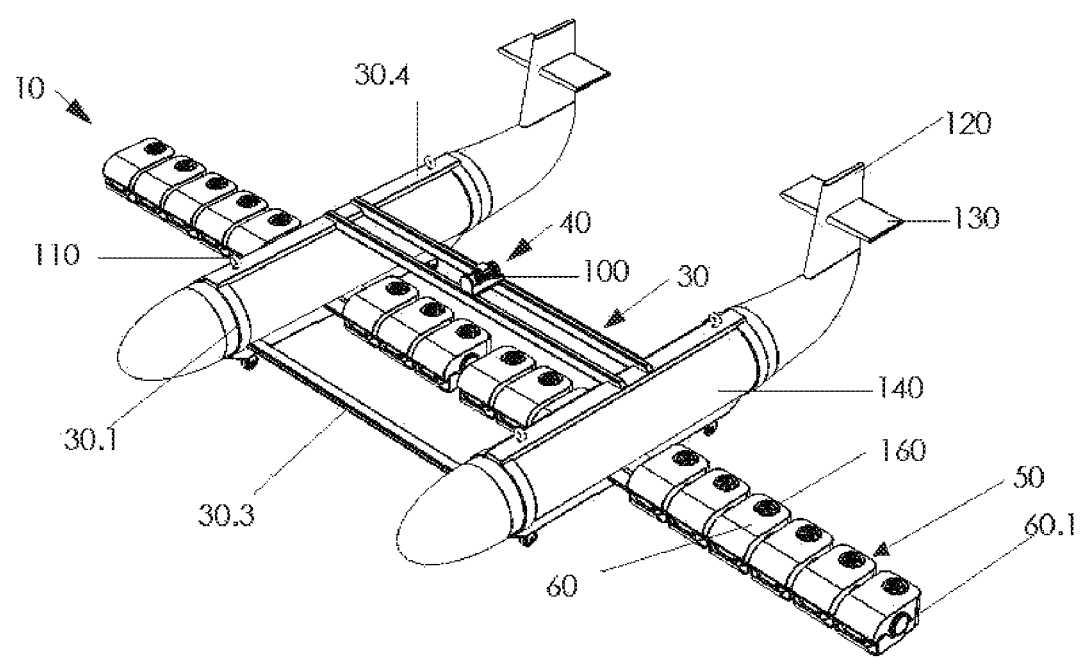
FIG. 1 is an upper perspective view of one exemplary multi-modular system embodiment.

Turning now to the drawings, in which similar reference characters denote similar elements throughout the several views, the figures illustrate multi-modular units held together to form a new aerial firefighting system. These modular units may work together or independently. The multi-modular system comprises one or more modular units, fluid, fluid conduit, reservoir, air flow generator, multi-modular unit support structure, aerial suspension system and aerial lift system.

FIG. 1 shows a perspective view of an exemplary multi-modular system, comprising two levels, the upper and lower level, the upper level providing a fluid supply (140), which is thus provided to a lower level where the fluid may flow to the multi-modular units (10). The fluid may flow from the upper level to lower level by gravity, and/or via a pump or other fluid pressure devices may be provided to increase the fluid pressure/flow from the upper level (140) to the lower level (10).

Figure 3:
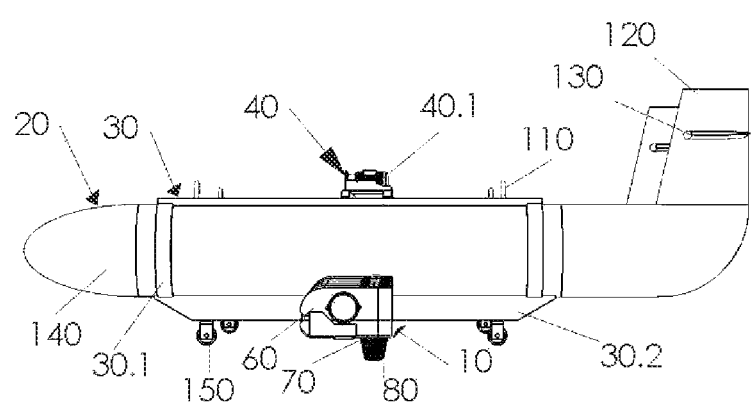
FIG. 3 is a side view of an exemplary multi-modular system embodiment.
Figure 4:
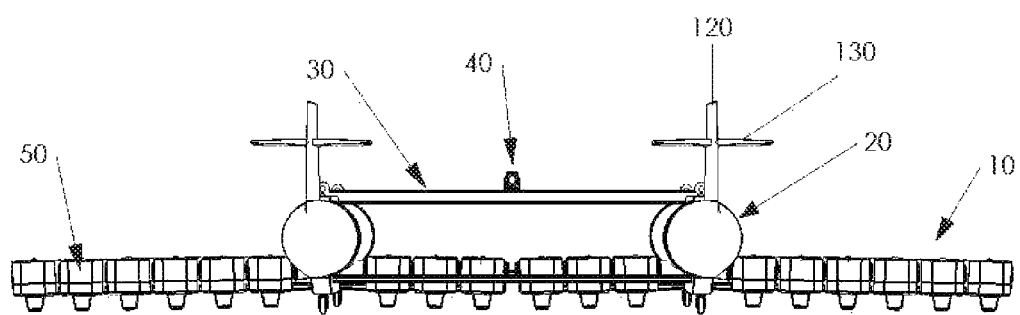
FIG. 4 is a rear view of an exemplary multi-modular system embodiment.
Figure 5:
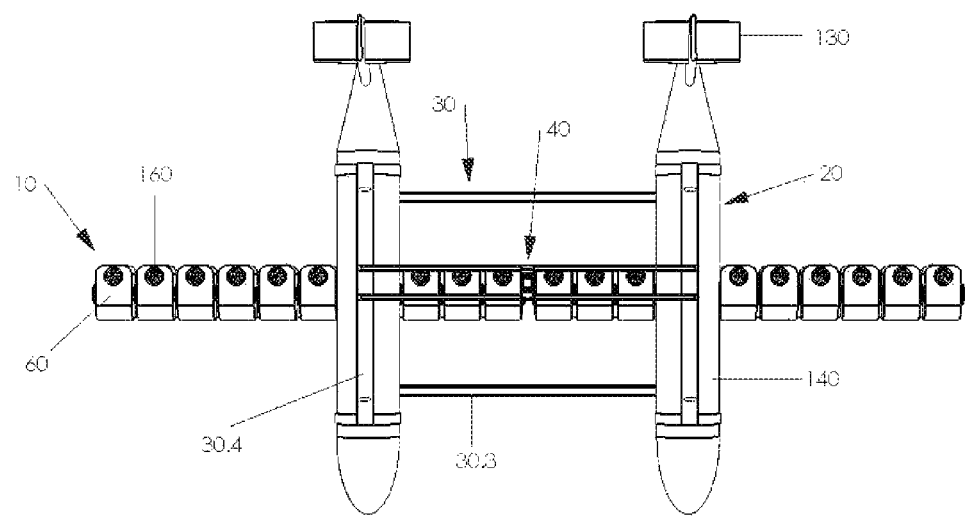
FIG. 5 is a top view of an exemplary multi-modular system embodiment.
Figure 6:
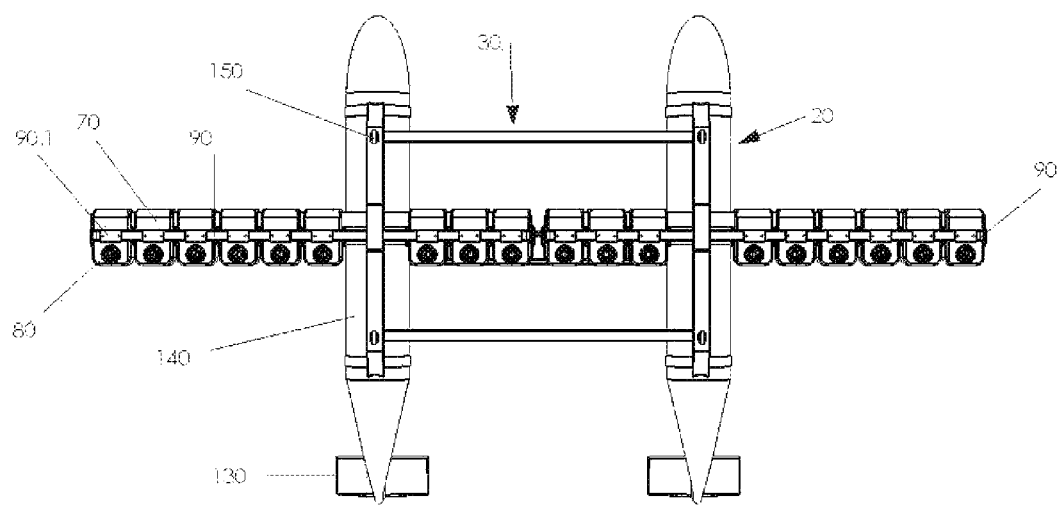
FIG. 6 is a bottom view of an exemplary multi-modular system embodiment.

In some exemplary embodiments, as shown in FIG. 1, the multi-modular aerial firefighting system may be provided with a suspension assembly as shown at (40), and may be suspended by a lift system like a helicopter. One end of a cable may be attached to the helicopter and the other end of the cable is attached to the suspension assembly (40). A reeling mechanism (40.1) shown in FIG. 3 may also be installed to allow the system to be reeled up or down in relation to the helicopter, to enable the position of the system to be adjustable relative to the fire source, in some cases to increase the load drop accuracy. Reeling the system back to an upper position near the helicopter, or other support aircraft may, in some cases, enable the system to be carried with less drag and improved aerodynamic stability. In some exemplary embodiments, a number of hooks, such as four hooks (110) may be placed on the system to make the system more aerodynamic stable.

In some exemplary embodiments, the system may be configured to direct fluid to the multi modular units (10) from a fluid source below the multi-modular units (10), such as by means of pump, or the like.

In some exemplary embodiments, the tank (140) may be fitted with a refilling opening or suction hose to allow the tank to be refilled with the emergency fluid. Also the tank may be fitted with an internal compartment to hold and mix a foam chemical solution or the like with water.

Figure 2:
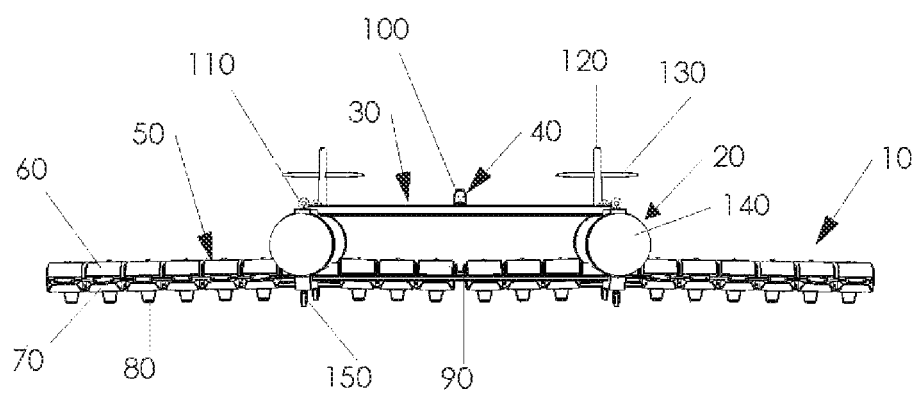
FIG. 2 is a front view of an exemplary multi-modular system embodiment.
Figure 15:
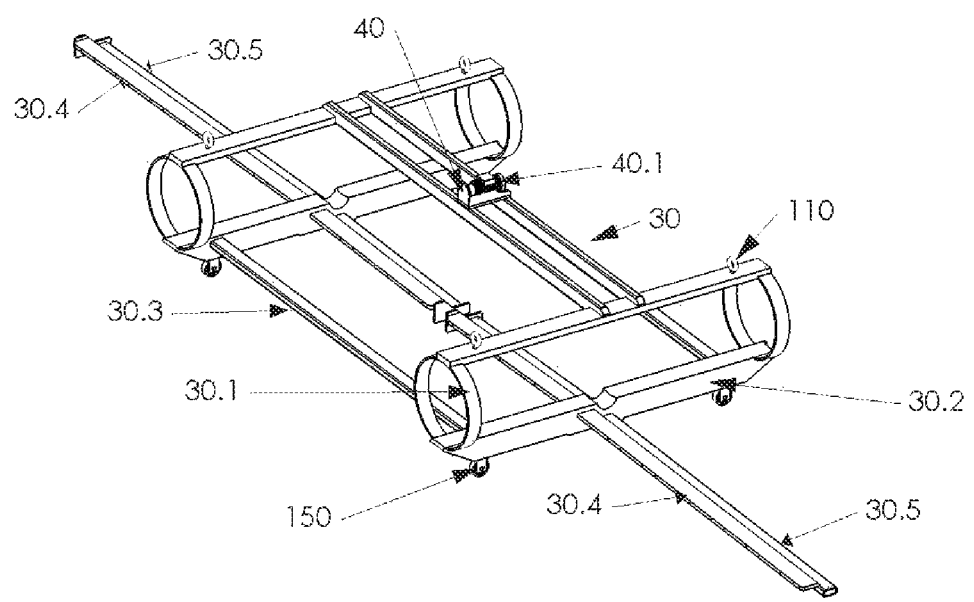
FIG. 15 is a perspective view of an exemplary support assembly.

FIGS. 2 and 15 show, in some exemplary embodiments, that the upper level reservoir (140) and the lower level multi modular units (10) are held together by a support structure (30), where the tank (140) is secured by bracket beams (30.2) or clamp (30.1) and joints (30.3). In this case, the multi modular units (10) are mounted on beam spars (30.4) and (30.5) that attached to the main support structure (30).

Figure 8:
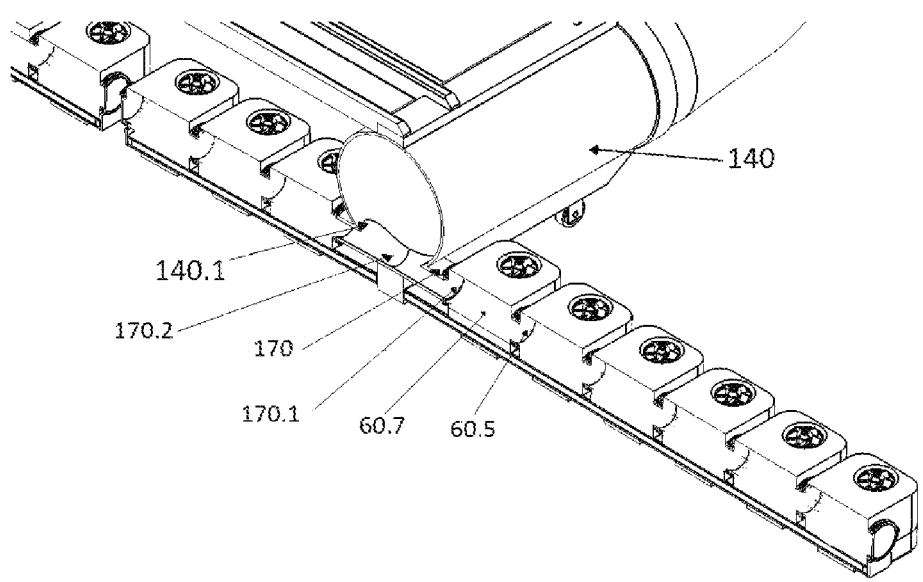
FIG. 8 is a cross-sectional view of one multi-modular system showing a fluid passage pathway through multiple modular units.

Referring to FIG. 8, the tank (140) has an opening or a valve placed at the bottom (140.1) to allow the fluid release to the multi modular unit reservoir and conduit housing (60.7) Thus, in this example, the fluid will flow under gravity force from the upper level to the lower level.

Figure 10:
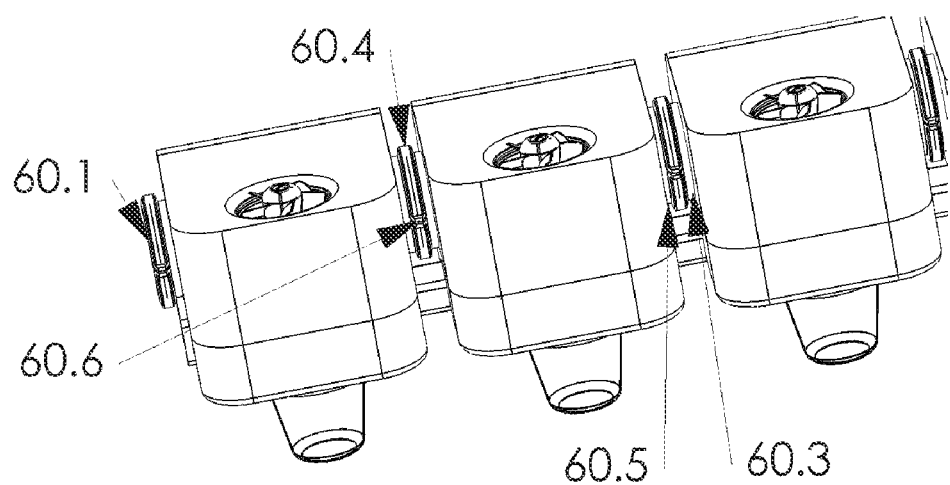
FIG. 10 is an enlarged view illustrating modular pipe joints that join several multiple-modular units.
Figure 14:
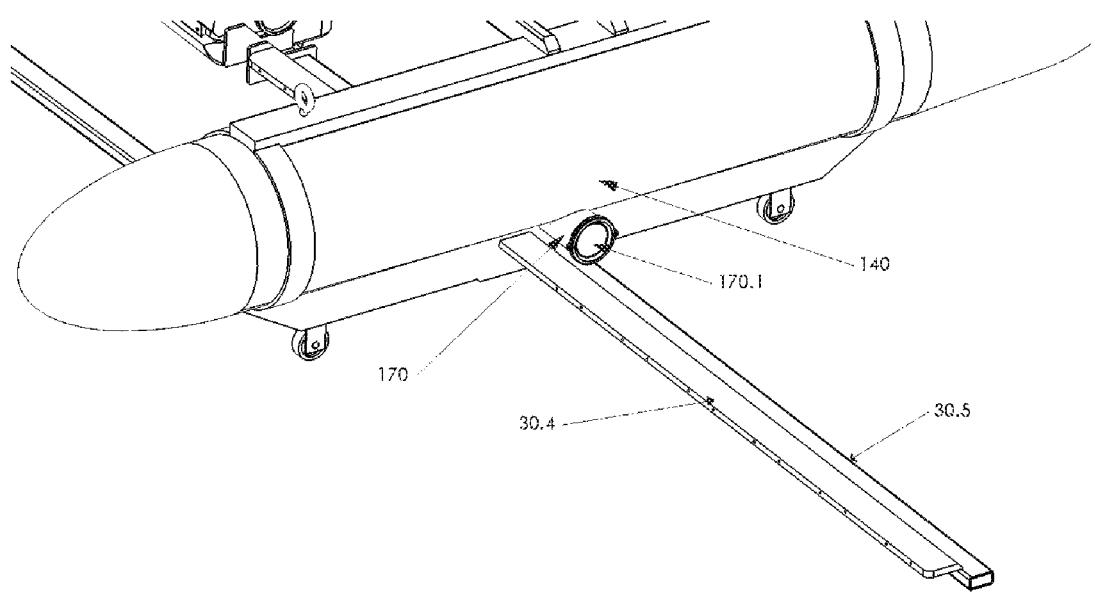
FIG. 14 shows a main supply tank mounted on a support assembly with the modular units removed for clarity.

A hub conduit, shown in FIG. 8 and FIG. 14 (170), may be configured to allow the fluid to be distributed from the reservoir tank (140) to the first modular unit entry connection pipes (60.5) shown in FIG. 10.

Figure 11:
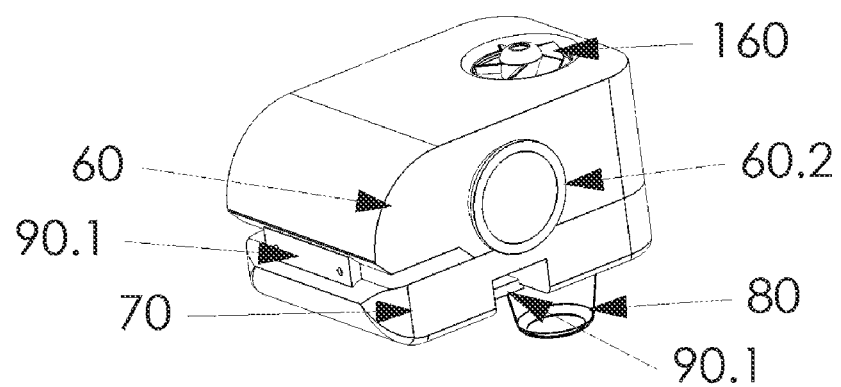
FIG. 11 is an enlarged view showing a single modular unit without any associated support structure.
Figure 12:
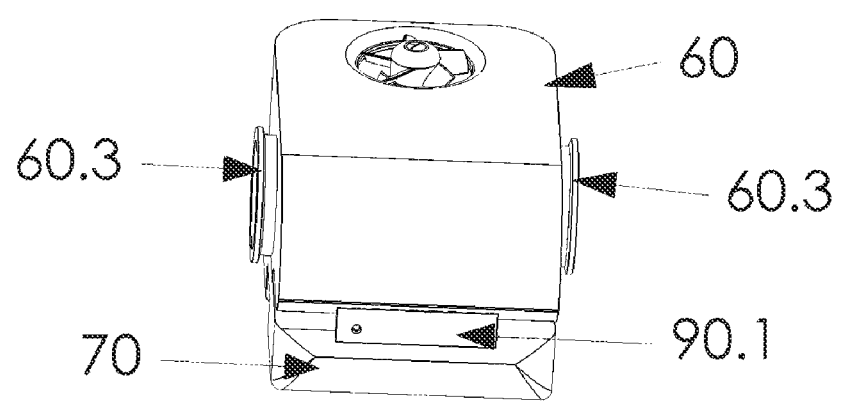
FIG. 12 is an enlarged view showing both entry and exit pipe connections of a single modular unit.

In some exemplary embodiments, the multi-modular units (10) comprise a modular unit FIG. 1 (50), FIG. 11 and FIG. 12, in multiples. Each modular unit (50) comprises a reservoir and conduit unit, shown in FIG. 8 and FIG. 9 (60.7), where the fluid may enter from the unit entry pipe FIG. 10 (60.5) and exit from the unit exit pipe (60.3). These pipes are placed on the sides of each modular unit. The exit modular pipes, shown in FIG. 10 (60.3), are connected to the adjacent modular unit entry pipe (60.5) and so on. Each modular unit entry and exit pipe may be joined and sealed using an O-ring clamp (60.4). These clamps may be opened or closed by a clamp latch (60.6).

Figure 7:
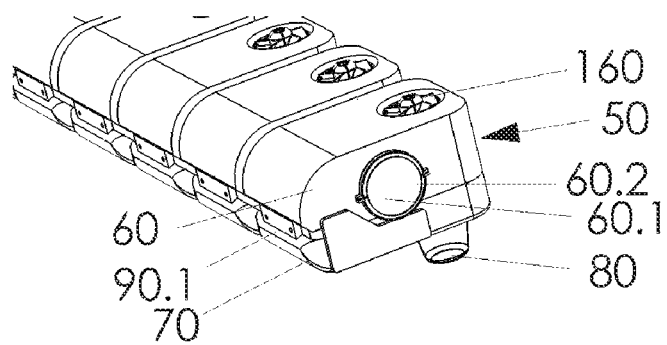
FIG. 7 is an enlarged upper perspective view of a portion of an exemplary multi-modular system embodiment.
Figure 9:
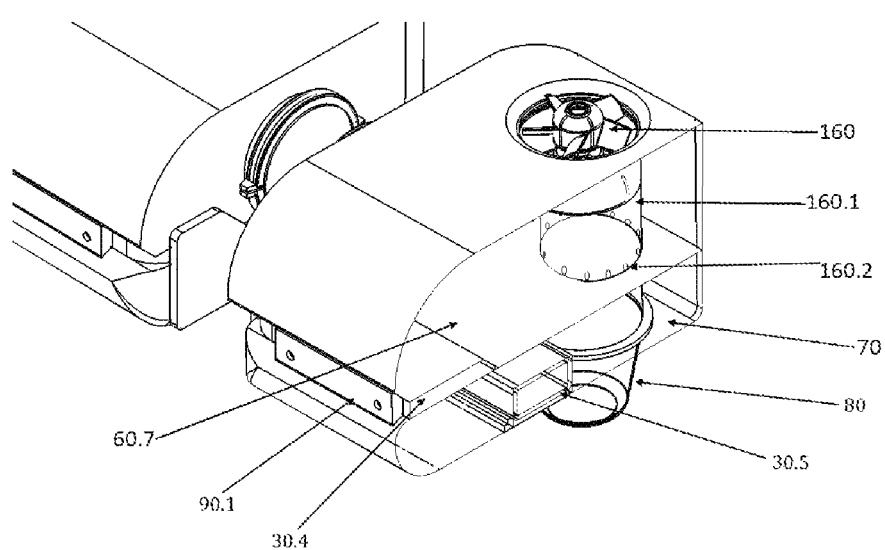
FIG. 9 is a cross-sectional view of one modular unit, which reveals inner compartments therein.

In some exemplary embodiments, the modular units together may be configured to allow the transport or transfer of the fluid in a flow from one modular unit to another through the entry and exit modular pipes (60.5) (60.3). A sealing cap (60.1) as shown in FIG. 7 may be placed at the last modular unit pipe opening to prevent the leakage of the fluid. Referring to FIGS. 9 and 10, each modular unit may be removed from the multi-modular structure by unfastening the block bar (90.1) on the front spar (30.4) and central spar (30.5) and also opening the o-clamps (60.4) from both sides of a single modular unit.

In some exemplary embodiments, as shown in FIG. 9 and FIG. 11, each modular unit may comprise two compartments. In general, the upper compartment (60.7) is a fluid reservoir and conduit compartment and a lower compartment is a power and storage compartment (70).

In some exemplary embodiments, the upper compartment may be configured to enable storage of the emergency fluid in each modular unit, while at the same time may assist to transport the fluid from one modular unit to the adjacent one through the entry and exit pipes (60.5) (60.3) that are opened to the upper fluid compartment (60.7).

In some exemplary embodiments, the upper compartment (60.7) is completely sealed from the lower compartment (70). The lower compartment (70), in some cases, may be configured to store the electrical components and connection of the propeller fan (160).

In some exemplary embodiments, the lower compartment (70) carrying electrical components and the upper compartment (60.7) may be reversed so that the electrical components etc. are positioned above the fluid. Alternatively, they may be located remotely from the modular unit. For example all power and electrical, control components from all modular units may be placed in one central compartment.

In some exemplary embodiments, each modular unit may also provide a plenum, in the form of a vertical wind tunnel (160.1) as shown in FIG. 9, located within the structure of the upper compartment (60.7) where the wind tunnel is opened to the top of the modular unit and opened at the bottom of the modular unit. In this case, the wind tunnel (160.1) is operatively sealed from the upper fluid compartment and the storage compartment (70) except for the controlled supply of fluids. To that end, one or more draining openings (160.2) may be placed at the lower end of the wind tunnel (160.1), and in communication with the upper compartment (60.7) for delivery of fluids therefrom to the wind tunnel.

In some exemplary embodiments, the fluid in the modular unit (60.7) may not be released or drained, except from the opening at the base of the wind tunnel (160.2).

In some exemplary embodiments, the emergency fluid may be drained from the modular fluid compartment (60.7) to inside the wind tunnel though (160.2).

In some exemplary embodiments, the wind tunnel opening (160.2) may be placed at the lower end of the fluid level of the modular compartment (60.7) and in this way the gravity force may allow the fluid to drain from a higher fluid level compartment to a lower level opening.

In some exemplary embodiments, using the gravity force to drain the emergency fluid may eliminate the need for pumps, which would otherwise require additional weight and expense, while in other exemplary embodiments, the use of pumps or other pressurizing systems may be beneficial. For instance, a bladder (in the main tank) or another configuration to provide a pressurized main tank (140) may be deployed to increase the fluid flow rate.

In some exemplary embodiments, the lower wind tunnel opening (160.2) may be fitted with a valve assembly to control the fluid flow rate inside the lower end of the wind tunnel. In this way the fluid may drain to the inside the wind tunnel lower end where the positive air pressure may push the fluid downward toward the mesh screen (80).

In some exemplary embodiments, when the emergency fluid is mixed with foam material, the mixing of fluid and air may occur either above or as they pass though the mesh screen (80) so as to generate foam.

In some exemplary embodiments, as shown in FIG. 9, a motorized propeller air fan (160) is mounted at the center wind tunnel (160.1), to generate positive pressure flow.

In some exemplary embodiments, the power supply for the motor driving the fan may be placed in the modular storage compartment (70) or through wires connecting the fan to a remote power supply.

In some exemplary embodiments, the airflow may be directed from the top opening of the wind tunnel to the lower opening, to provide sufficient airflow to mix with the fluid then pushed toward the mesh screen (80) to generate foam. In this way, the fluid to foam ratio may be controlled by controlling the airflow or the fluid flow. Thus, using positive pressure airflow will allow for a higher fluid to foam ratio of up to 1:1200 or more, as necessary and configurable for each particular application. The foam will thus increase the volume of effective fire retardant material, thus increasing the extent of a fire that can be covered by the aircraft payload.

In some exemplary embodiments, at the lower end of the wind tunnel (160.1), a wire mesh may be placed to allow emergency fluid to form foam or mist depending on the fluid type and the fluid/air flow rate.

Figure 13:
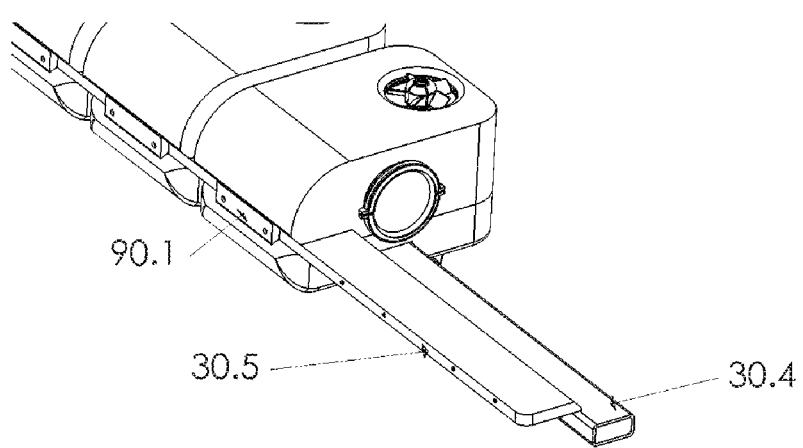
FIG. 13 is an enlarged view revealing a support spar for mounting the multi-modular units of a multi-modular unit system.

FIG. 13 illustrates how the multi-modular units may be mounted on the support structure spar, in one of a number of possible configurations. FIG. 14 illustrates the multi-modular system without the modular units, with the tank hub connection (170) at the bottom of the tank (140) to facilitate fluid flow from the tank to the hub under gravity force by location of the hub lower on the tank. The hub conduit opening (170.1) is configured to allow fluid to flow to the modular units.

FIG. 15 shows an exemplary multi-modular unit system support structure that holds the multiple tanks and modular units. The support structure comprises beams (30.2) (30.3) and a round clamp (30.1) to hold each tank. On top of the support structure, a reeling and suspension assembly (40) (40.1) is mounted, while landing gear is located beneath (150).

Figure 16:
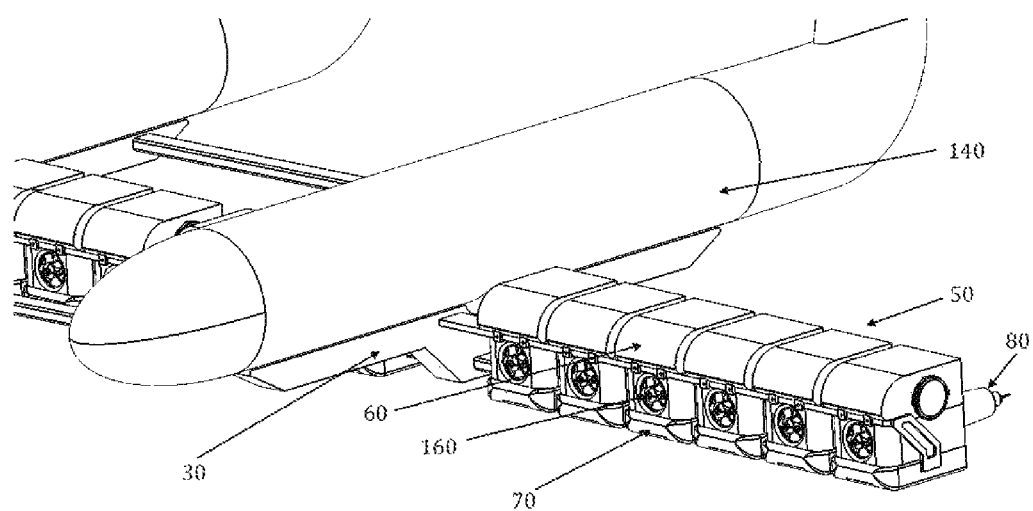
FIG. 16 depicts an alternative embodiment having a horizontally mounted modular-unit propeller assembly.
Figure 17:
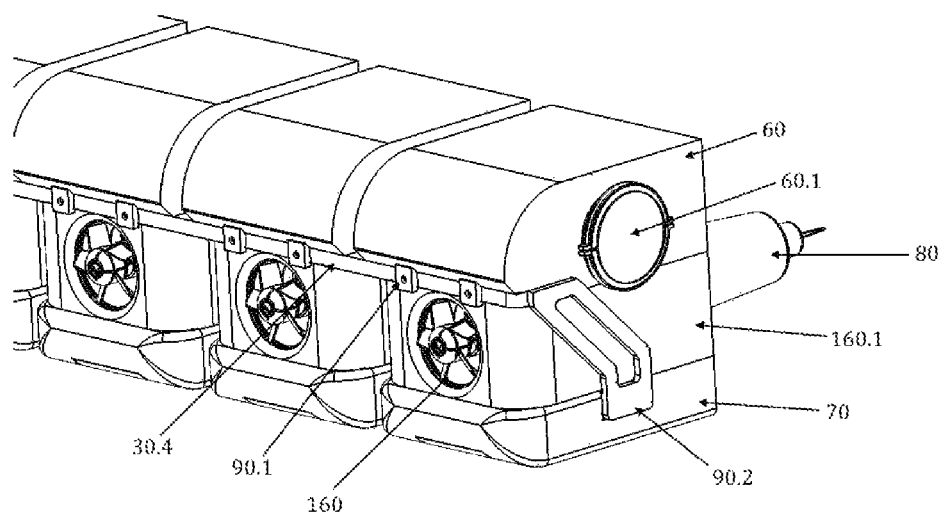
FIG. 17 is an enlarged view of the horizontally mounted propeller fan modular unit.

In some exemplary embodiments, as shown in FIG. 16, the wind tunnel and propeller fan may be configured horizontally or angularly off a vertical orientation relative to the mounted orientation of the modular unit (160), for example with the fluid compartment (60) positioned above placed on top of the wind tunnel and the storage compartment (70) below the wind tunnel, as shown. FIG. 17 shows an enlarged view of the modular units with the wind tunnel (160.1) placed horizontally. The modular units may be secured to the support spar (30.4) by assembly block (90.1) and end plate (90.2).

In some exemplary embodiments, an opening and valve may be placed at the bottom floor of the fluid compartment (60) to allow the fluid to flow inside the horizontal wind tunnel. The fluid may then be directed toward the wire mesh (80) placed at the end of the horizontal wind tunnel to form foam or mist, to form the emergency fluid.

In some exemplary embodiments, an aerial suspension system (40) is configured to lift and suspend the new multi-modular firefighting system, by way of a suspension cable with two ends. One end is connected to the aerial lift system and the other end to the new aerial firefighting system structure. A reeling mechanism such as a winch (100) may be added to the aerial suspension system to reel the system up and down in reference to the aerial lift system. The aerial suspension system is configured to suspend and reel up/down the whole multi modular unit firefighting apparatus. The suspension system comprises a cable, an aerial attachment connection to attach the cable, a multi-modular attachment connection to attach the other end of the cable to the multi modular system, a cable reeling mechanism to reel up/down the multi-modular system in reference to the lift system, such as a helicopter. The system is also provided with a controller to control the suspension and reeling function.

In some exemplary embodiments, the suspension system may comprise one or more cables. Suspension and connection hoses also may be provided to supply the multi-modular apparatus with fluid in case the reservoir is mounted on the lift system.

The reeling mechanism may be provided in the form of a winch, which may be mounted on the aerial lift system, on the suspension cable or on the multi-modular apparatus.

Fluid conduit (60) is provided to carry the fluid from the reservoir (140) to the each unit. The reservoir may be mounted on the multi-modular system, on the lift system, or may be independent with a connection conduit.

The reservoir (140) holds the fluid and supplies it to the multi-modular firefighting apparatus through the fluid conduit (60).

A refill mechanism may be placed on the multi-modular apparatus to allow for refilling of the reservoir. The reservoir (140) may have a foam solution section to hold and mix the solution with water in certain concentrations. The fluid in the reservoir may be premixed or mixed inside the reservoir.

The fluid conduit may thus be configured to supply each modular unit with the fluid to be distributed. A controller valve is also provided to control fluid flow.

The reservoir may be made of single or multiple structures. It may be mounted on the multi-modular firefighting apparatus, located at an aerial location, such as a helicopter or plane, or located on the ground a connection hose joining it to an aerial location such as a hovering helicopter, ground-based boom device or the like.

Also the fluid conduit (60) to each modular unit may replace the need for the main reservoir by making it large enough to hold the desired amount of the fluid.

A fluid pump, or flexible pressure chamber, may be used to increase the fluid pressure and deliver the flow from the reservoir.

The reservoir(s) may be configured to hold fluids useful for the methods described herein. These fluids may contain a range of fluids used by firefighters to control a fire, such as water, solution, foam, gel, mixed fluid, chemical and other materials, as would be understood by those of skill in the art.

Water may be used alone or mixed with certain chemicals, solutions, slurries, and the like to make the water more efficient in controlling or preventing the fire. The fluid inside reservoir (140) may be configured to provide a mixing function for the solution mixer assembly to reach a desired concentration and/or consistency. The fluid may be premixed before loading.

Fluid types may depend on the utility and purpose of the mission that is of the type of fire or the like. For example, in case of a de-icing mission, the reservoir may be filled with de-icing fluid to provide de-icing of structures like high voltage cables, airplanes and others. For oil containment, fluids used in the industry may be deployed with exemplary system embodiments herein, to contain and/or dissolve spilled oil on land or at sea.

Each unit may be fitted with an air generator (160, 50) to enable fluid distribution and/or foam formulation. This generator may comprise a structure to capture wind air or actively generate positive pressure flow, such as a motor and a propeller fan (160). The motor may be powered by water, electricity, gas or any other viable source to run the fan, provided it is capable of functioning on location in the unit at the required power level to deliver sufficient power.

The air flow generator may also be deployed to mix fluid with air for fluid distribution, foam formulation and deployment.

The air flow generator may be provided in a number of configurations including, in one example, a motorized propeller in different speed and size configurations depending on the application.

The power may be generated from an electrical, water pressure and gas motor to run the propeller to generate air flow.

An adaptor may be mounted on the air flow generator like a screen (80) to allow the fluid to be formulated into foam.

Nozzles from a fluid conduit may be placed in front of the air flow to allow the fluid to be mixed with air.

Other configurations may be deployed to generate air flow, such as with scoops or hoods, to harvest air from wind currents generated on the structure when the multi-modular structure travels.

In some exemplary embodiments, an air entry opening may be provided to allow harvesting of wind generated from a helicopter rotor or wind force to flow and mix the fluid. In such case, a powered fan may or may not be deployed to generate more air flow.

The modular units may be carried side by side by the support structure (30) to allow them to be used as one system. The support structure may be configured to secure the reservoir (30.1, 30.4), fluid conduit support structure (90), air generator units support structure (90, 90.1) and other system components.

In some exemplary embodiments, the support structure also comprises the aerial lift suspension system (40), which may be used to mount all the parts of the apparatus. The purpose is to secure the parts together, as well as to provide an effective steering mechanism. Adding one or more horizontal stabilizers (130) and vertical stabilizers (120) may help to balance the apparatus when in use.

Landing gear (150) may be positioned for effective landing and transportation. Supporting structure may allow the components, along with the supporting structure itself, to be non-removable, or removable for assembly, disassembly, storage and transportation, as need be.

In some exemplary embodiments, the use of the modular units enables different system configurations, or shapes, depending on the need, application and the like. For example an H shape may be deployed with several rows of multiple-modular units to provide a more condensed fluid delivery that is at an effective fluid delivery rate given. V shaped configurations may be more effective for narrower field delivery footprints, particularly when the system is being used in relatively narrow access ways and the like, such as in valleys, ravines and the like.

In some exemplary embodiments, the support structure may be configured to enable the multi-modular units to be oriented between operative and inoperative positions either horizontally or vertically, to assist with storage, fluid refill in tight areas and easy transportation.

Propellers or jets may also be added for better control of the pitch, yaw and roll.

In some exemplary embodiments, the system comprises one or more modular units (50). Each modular unit may work independently or together to distribute the fluid.

In some exemplary embodiments, each modular unit may be configured to include an air flow generator (160), fluid conduit (60), fluid, and power supply assembly (70). These modular units may be connected to the support structure (30).

In some exemplary embodiments, the modular unit may comprise an air flow generator, reservoir, fluid conduit, fluid nozzle distribution, foam mixing compartment like screen (80).

In some exemplary embodiments, the modular unit may be configured to distribute fluids in different formats including foams, slurries and the like.

In some exemplary embodiments, a fluid valve may be placed in the unit to control the fluid flow.

In some exemplary embodiments, a power supply may be provided to the air flow generator by a wire or by a power unit mounted on or outside the air flow generator.

In some exemplary embodiments, the modular unit may be permanently secured to the support structure or may alternatively be removable.

In some exemplary embodiments, power supply and controller functions may be carried out in situ or be delivered to the unit from a remote source.

In some exemplary embodiments, the reservoir located in the modular unit may be replaced by a central reservoir located on the main multi-modular structure.

In some exemplary embodiments, the aerial lift system may be configured to lift the multi-modular firefighting system and to carry it to a target area like a wild fire. One such example includes a helicopter. The multi-modular system may also be hooked or mounted on the helicopter. Other lift systems may be used, such as firefighting vehicle ladders, airplanes, lighter than air vehicles, cranes and the like.

In some exemplary embodiments, a helicopter may be configured to carry, move, and use the multi-modular firefighting apparatus. The apparatus may be mounted on the helicopter or suspended by a cable. The fluid reservoir may be mounted on the helicopter with a supply hose connected to the apparatus.

In some exemplary embodiments, the aerial lift system may be incorporated into a common vehicle with the multi-modular unit apparatus, by using a multi-rotor on it as structure to lift and move the apparatus.

In some exemplary embodiments, lighter than air vehicles may also be used to carry and move the apparatus.

In some exemplary embodiments, two or more multi-modular units may be arranged together to achieve the desired shape according to the job required. The reservoir may be secured to the support structure by using straps, screws or other couplings. Two reservoirs may be secured together and to the support structure.

In some exemplary embodiments, the reeling mechanism assembly may be placed in the middle of the two reservoirs and in the middle of the apparatus structure for better balance. The reeling winch may be placed in the center to reel the structure apparatus up and down in reference to the aerial lift system.

In some exemplary embodiments, the reservoir may have a fluid refill pump to allow the reservoir to be refilled with fluid. The pump may be placed to pump the fluid from the reservoir to the modular unit.

In some exemplary embodiments, the reservoir may have a valve at the bottom and connected to the fluid conduit. The fluid conduit may be configured to carry the fluid from the reservoir to the each modular unit. The fluid conduit may be secured to the apparatus support structure. The fluid conduit may have a distribution nozzle at the level of the each modular unit. Another valve at each modular unit may also be placed to better control the fluid flow.

In some exemplary embodiments, the air flow generator may be secured to the apparatus structure and direct the air flow to the distribution nozzles. A mixing chamber may be provided to mix the air and fluid and a screen may be placed in the frame of the air flow and fluid nozzle distribution head to allow the formulation of the foam.

In some exemplary embodiments, the air flow generator power supply may be secured to the modular unit or to the structure apparatus. A battery, power generator or power supply from the helicopter may deliver power to the air flow generator.

In some exemplary embodiments, a reeling assembly, one or more valves, and/or an air flow generator may communicate with a main controller to control and synchronize their function(s), and may be placed near the operator and connected to the multi-modular firefighting apparatus by wired or wireless connection.

In some exemplary embodiments, a reservoir may be mounted on the aerial lift system with a supply connection hose to connect the reservoir to the multi-modular unit.

In some exemplary embodiments, the reservoir may be located on the ground like a fire truck and a connection hose connecting it to the multi-modular apparatus.

In some exemplary embodiments, a reeling winch may be placed on the aerial lift system or it may be eliminated and use a suspension cable alone.

In some exemplary embodiments, the aerial lift system may be incorporated with the multi-modular apparatus by having a single or multi rotor placed on the modular motor apparatus, which may be controlled remotely.

In some exemplary embodiments, when used in connection with the airplane, the multi-modular apparatus may be placed below the wings or near the rear of the airplane. In some exemplary embodiments, the reservoir may be placed inside the airplane.

In some exemplary embodiments, the multi-modular apparatus may be incorporated in the airplane wing to decrease drag and simplify airplane modification.

In some exemplary embodiments, the multi-modular firefighting apparatus is configured to give the operator better, or alternative, control over fluid drop and over the amount, type, elevation, area and distribution density thereof. The operator may fill the reservoir with water and foam solution. The operator may activate the water and foam solution mixer on the ground or during flight.

During operation of some exemplary embodiments, an operator may fill the tank (140) with water and foam solution though suction hose or a filling opening. The multi-modular system may then be suspended to a helicopter, or other airlift vehicle for instance, by a cable. The foam solution may then be mixed inside the tank prior to release of the fluid to the modular units.

A valve may be deployed to control the release of fluid from the tank to the hub conduit (170). The operator may then prepare the system prior to dispatch to a target fire area. In this case, the modular system may be reeled up, until reaching the target area, and then it may be reeled down using reeling and suspension mechanism (40) to a desired deployment elevation, according to the prevailing conditions at the site.

In some exemplary embodiments, the operator selects the target area like a wild fire and calculates the operation parameters applicable for a particular fluid drop for the wild fire, such as distance, flame height, temperature and other factors. The operator may then connect one end of the cable from the suspension assembly to the helicopter. The helicopter may then be controlled to lift off and fly with the installed multi-modular system. When reaching the target area, the operator may then reel down the apparatus to the desired fluid drop height. The operator may then activate the apparatus to allow the run of the air flow generator and open the fluid valves. When the apparatus starts producing foam, the helicopter pilot may fly over the target fire to execute the fluid drop, to assist in extinguishing the fire. The operator may then communicate with the pilot to allow the right flight direction and height. When the operator finishes the fluid drop, he or she will turn the air and fluid flow off and reel up the multi-modular apparatus.

The operator may then simultaneously open the tank valve and power on the propeller fans of the modular units. Referring to FIG. 9, the fluid then flows from the tank (140)

to the hub conduit (170) then to the fluid compartment (60) of the nearest modular unit, at which time the fluid is then distributed along the modular units via the adjacent entry and exit pipes (60.3) and (60.5), and thus from the first fluid compartment (60) to the adjacent units until all the fluid compartments are filled with the emergency fluid. The fluid flows under gravity force from the tank above the modular unit to units placed lowered to the tank. The fluid then drains though the opening at the bottom of the wind tunnel compartment (160.2). The propeller fan (160) generates positive airflow pressure and pushes the air and fluid downward. When water, already mixed with foam solution, is mixed with air and pushed toward the wire mesh (80), foam will be generated. After emptying the load, the operator may then turn off the propeller fans and reel the modular system back up to its storage or travel position relative to the helicopter, or the like. The operator may then return or be directed to a refilling location to refill the tank for another operation. The operator may refill the reservoir by activating the refill pump, while the pilot may hover over top of the fluid source to allow the fluid refill for another operation.

In some exemplary embodiments, in cases where the fluid source and reservoir are on the ground, the operator may attach the multi-modular apparatus to the helicopter then fly near the target. The operator may reel down the apparatus to the ground, to allow the ground crew to connect the supply hose to the apparatus. The pilot and operator may then fly over the target area and activate the fluid and air flow valves.

In case of using water alone, the operator may remove the screen from the multi-modular to allow the fluid to be delivered in different ways like mist, large particles or liquid form.

In some exemplary embodiments, a supply hose may be connected to the multi modular system to supply fluid from the ground level, to supplement or to replace the central tank(s) (140).

In some exemplary embodiments, the multi-modular system may be changed and rearranged in different configurations, such as two rows of multi-modular units, or square, T, H, or circular configurations. Thus, the modular units may be placed in different configurations, which may suit different fire sites, weather conditions, approach speeds and the like, to maximize the coverage area.

In case of de-icing, the reservoir may be filled with de-icing fluid and the operator will activate the multi-modular function when reaching to the target area.

In case of oil containment, the operator may fill the reservoir with oil containment fluid, and then activate the multi-modular function when reaching the target.

In case of weather control, the operator may fill the reservoir with water and activate the multi-modular function.

In case of agricultural use, the operator may fill the reservoir with the needed chemicals and activate the multi-modular apparatus to distribute the fluid.

What has been described and illustrated herein are certain exemplary embodiments of the invention. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

REFERENCE NUMBER INDEX (10) Multi-modular units
(20) Reservoir and body support structure
(30) Support structure
(30.1) Tank support ring
(30.2) Framework structure
(30.3) Front tank support beam
(30.4) Support assembly front spar
(30.5) Support assembly central spar
(40) Suspension and reeling assembly
(40.1) Winch assembly
(50) Single modular unit
(60) Modular reservoir and conduit housing
(60.1) Conduit cover
(60.2) Pipe connection conduit flange
(60.3) Outlet pipe opening
(60.4) Pipe joint O-ring clamp
(60.5) Inlet pipe opening
(60.6) O-ring clamp latch
(60.7) Modular reservoir and conduit
(70) Modular power housing unit
(80) Mesh screen
(90) Multi-modular units support assembly
(90.1) Support block to secure the unit to front and central spar
(90.2) Support assembly spar stopper
(100) Suspension reeling winch
(110) Hock on the support assembly
(120) Vertical stabilizer
(130) Horizontal stabilizer
(140) Reservoir fluid tank
(140.1) Opening at the bottom of the reservoir to allow the fluid to flow to the multi-modular units
(150) Landing gear
(160) Propeller fan assembly
(160.1) Wind tunnel
(160.2) Opening drain on the wind tunnel
(170) Hub conduit connection
(170.1) Hub conduit opening end to connect to the modular unit
(170.2) Hub conduit to allow the fluid flow from the upstream reservoir to modular unit

What is claimed is:

1. A support system for use with an aircraft for suspending and supporting an array of modular foam generators for use in aerial foam delivery activities, comprising a support structure configured to be suspended from the aircraft, the support structure including a plurality of designated mounting zones, each to receive one or more of the modular foam generators along the support structure, so as to configure the array of modular foam generators for the aerial foam delivery activities, an array of at least one modular foam generator configured to be mounted at a corresponding one of the designated mounting zones and wherein the array further comprises one or more thrusters configured to steer the array relative to the aircraft.

2. A system as defined in claim 1, further comprising a reeling mechanism configured to raise and lower the support structure relative to the aircraft.

3. A method of aerial firefighting using an array of foam generators suspended from an aircraft, comprising:
arranging the array in a selected one of a number of delivery path configurations;
suspending the array from the aircraft with at least one thruster to orient the array;
supplying each of the foam generators with a foam solution; and activating the-at least one thruster, while activating one or more of the foam generators in the array to deliver foam to a designated target.

\* \* \* \* \*